United States Patent Office 3,328,443
Patented June 27, 1967

3,328,443
NEW TETRAKIS(ORGANOPHOSPHORUS) NICKEL, TETRAKIS(ORGANOARSENIC) NICKEL, AND TETRAKIS(ORGANOANTIMONY) NICKEL COMPLEXES AND METHODS OF PREPARING THE SAME
Reginald F. Clark and Charles D. Storrs, Lake Charles, La., assignors, by mesne assignments, to Columbian Carbon Company, a corporation of Delaware
No Drawing. Filed Dec. 5, 1960, Ser. No. 73,560
31 Claims. (Cl. 260—439)

This invention relates to derivatives of nickel tetracarbonyl. More specifically it relates to nickel complexes in which all four carbonyl groups are replaced by organic compounds of phosphorus, a process for producing such complexes, and a method for employing such complexes as catalysts.

The tetrakis complexes of groups VI and VIII metals of the periodic chart are fairly well known, but such complexes have been limited to the inorganic complexes. Such complexes as nickel tetrakistribromo phosphine and nickel tetrakistrifluorophosphine are described by Weber in Patent No. 2,882,306. Such compounds are prepared by heating nickel tetracarbonyl with excess phosphorus trichloride in a steam bath, the carbonyl radicals being replaced by the phosphorus trichloride.

The tetra-substituted complexes of the prior art have been limited to the inorganic complexes of nickel, and heretofor, the tetra-substituted organic complexes of nickel were unknown.

It is therefore an object of the present invention to provide a new composition of matter with comprises the tetra-substituted nickel complexes in which the substituents comprise triorgano phosphine, or triorgano phosphite. It is still another object of this invention to provide a method for producing such tetra-substituted nickel complexes. It is still another object of this invention to provide a process for using organo-phosphorus nickel complex catalysts which will give a high conversion and a good selectivity for catalyzing organic reactions.

Various and other objects and advantages of the present invention will become apparent to those skilled in the art from the accompanying description and disclosure.

The tetra-substituted complexes of this invention may be represented by the following formula;

in which $Z^1$, $Z^2$, $Z^3$ and $Z^4$ are the same or different compounds represented by the formula $$M(O_aR^1)(O_aR^2)(O_aR^3)$$

in which M is phosphorus, arsenic, or antimony, although phosphorus is preferred; $a$ is a cardinal number and is equal to one or zero; and $R^1$ and $R^2$ and $R^3$ are the same or different organic radicals. These radicals may be substituted or unsubstituted hydrocarbons in which the substituents comprise hydrogen, carbon, oxygen and halogen. In other words, these radicals may include hydrocarbyl radicals and substituted hydrocarbyl radicals. Examples of unsubstituted radicals which are suitable for use in this invention are alkyl radicals such as methyl, ethyl, propyl, isopropyl, n-butyl, sec-butyl, tert-butyl, amyl, isoamyl, hexyl, heptyl, octyl, isoctyl, dodecyl, and octadecyl; cycloalkyl radicals such as cyclopropyl, cyclobutyl, cyclopentyl, cyclohexyl, and cyclooctyl; aryl radicals such as phenyl, biphenyl, α-naphthyl, β-naphthyl, α-anthryl, β-anthryl, 1-phenanthryl, 2-phenanthryl and 9-phenanthryl. Examples of substituted radicals which may be used are alkaryl such as tolyl, xylyl, 2-mesityl, duryl, cumenyl, as-pseudocumyl, s-pseudocumyl, and v-pseudocumyl; alkyl substituted cycloalkyl derivatives such as 3-methyl cyclopropyl, 3,4 - dimethylcyclohexyl, 3 - amylcyclohexyl and 3,5-dimethylcyclooctyl; aralkyl such as benzyl, phenethyl, m-tolylmethyl, 1-mesityl, m-tolylethyl, 3-phenyl-1-propyl, and β-naphthylmethyl; oxygen containing radicals including alkoxyphenyl, alkoxyalkyl, hydroxyphenyl and alkoxy, such as anisyl, salicyl, desyl, vanillyl, phenetyl, phenacyl, acetonyl, acetoxy, p-methoxyphenyl, p-ethoxyphenyl, methoxymethyl, methoxyethyl, 3-methoxycyclopentyl, and p-acetophenyl; fluorine, chlorine, bromine and iodine substituted hydrocarbon radicals including haloalkyl, halocycloalkyl, and haloaryl, such as p-chlorophenyl, 2-chloroethyl, m-(trifluoromethyl)phenyl, 3-bromocyclohexyl. As may be seen from the foregoing, the alkyl radicals disclosed include those which have 18 carbon atoms or less, the aryl radicals disclosed include those having 14 carbon atoms or less, and the cycloalkyl, alkyl substituted cycloalkyl, aralkyl, alkoxyphenyl, alkaryl, alkoxyalkyl, hydroxyphenyl, alkoxy, haloaryl, haloalkyl, and halocycloalkyl radicals all have 11 carbon atoms or less.

The bonding arrangement of these complexes, as shown by the dashed lines in the formula above, is believed to be a coordination bonding system completely lacking in ordinary valence bonds; thus the nickel atom of the complex is in the zero valence state.

It has been discovered that the nickel complexes of this invention may be prepared from nickel tetra-carbonyl, mono-substituted nickel tricarbonyl, di-substituted nickel dicarbonyl, or tri-substituted nickel monocarbonyl, thus permitting the substituents to be the same or different. The various nickel complexes containing carbonyl groups which are suitable starting materials for the complexes of this invention are described in U.S. patents numbered 2,686,208; 2,686,209; 2,839,510 and elsewhere.

The reactions which produce such nickel complexes may be presented in a general way by the following formulas:

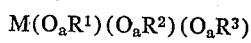

(1) $Ni(CO)_4 + 4Z \rightarrow Z_4Ni + 4CO$
(2) $Z^1Ni(CO)_3 + 3Z^2 \rightarrow (Z^1)(Z^2)_3Ni + 3CO$
(3) $(Z^1)(Z^2)Ni(CO)_2 + 2Z^3 \rightarrow (Z^1)(Z^2)(Z^3)_2Ni + 2CO$
(4) $(Z^1)(Z^2)(Z^3)NiCO + Z^4 \rightarrow (Z^1)(Z^2)(Z^3)(Z^4)Ni + CO$ It will be apparent to one skilled in the art that a wide variety of substitutions and mixtures of substitutions may be produced merely by varying the reagents added to the reaction at the various carbonyl substitution stages. For example, if it were desired to produce tris(triphenylphosphite) mono(triphenylphosphine) nickel, such a product could be prepared by reacting one mole of mono(triphenylphosphine)nickel tricarbonyl with 3 moles of triphenylphosphite. Another method in which the same compound might be prepared would be to react one mole of tris(triphenylphosphite)nickel monocarbonyl with 1 mole of triphenylphosphine to produce the desired compounds.

Reactions (1), (2), and (3) listed above actually consist of a plurality of steps or stages which occur as the respective carbonyl groups are replaced. These steps or stages may be carried out in sequence or alternatively and preferably as a unitary reaction in which the reactants are added in the required amounts initially, and which requires only temperature and pressure control of the reaction vessel.

It has been found desirable to carry out the replacement reaction in the presence of stoichiometric excesses of the replacing compound; that is, more than 4 moles of triphenylphosphite would be used to produce one mole of tetrakis(triphenylphosphite)nickel from one mole of nickel tetracarbonyl. When the nickel complex is to be produced from the tetracarbonyl according to Formula 1, the molar ratio of tetracarbonyl to replacing compound (Z) is preferably from about 1:4.5 to about 1:8. When the tetra-substituted nickel complex is to be produced from the mono-substituted nickel tricarbonyl complex according to Formula 2, the ratio of the complex to the substituting compound ($Z^2$) should be from about 1:3.5 to about 1:7. When the tetra-substituted nickel complex is to be produced from the di-substituted nickel dicarbonyl according to Formula 3, the ratio of nickel complex to substituting compound ($Z^3$) should be from about 1:2.5 to about 1:4. When the tetra-substituted nickel complex is to be produced from the tri-substituted nickel monocarbonyl according to Formula 4, the molar ratio of the nickel complex to the substituting compound ($Z^4$) is preferably from about 1:1.1 to about 1:2.

The molar ratios specified above are preferred ratios and reflect the use of quantities of phosphorus containing compounds which are from about 10% to about 100% stoichiometric excesses. The upper limitation i.e. 100%, is not critical. The use of 200% or even 300% excess may be desirable in some applications, since such excesses do not materially affect the reaction, but rather act as a diluent for the reaction mixture. Reacting the nickel complexes with less than 100% of the stoichiometric requirements of phosphorus compound are useful under some conditions.

Since nickel tetracarbonyl is highly toxic and decomposes rather violently at temperatures above 60° C. at atmospheric pressure, it is preferable to initiate reactions represented by Formula 1 in a solvent and at temperatures below 20° C., and complete the replacement of the first carbonyl group at this temperature. Temperatures up to about 40° C. may be used, but the 20° C. maximum is preferred. Completion of the first stage of the reaction is evidenced by a sharp decrease in the amount of carbon monoxide evolved. At this point the danger of explosion is diminished since almost all of the nickel is in the form of a complex; thereafter other heating steps are commenced. The subsequent steps of reaction (1), and reactions (2), (3), and (4) are carried out by a rapid heating to above about 180° C., or by a gradual or stepwise heating in which the temperature is increased each time that the carbon monoxide evolution ceases.

When the stepwise method of heating is employed it has been found that the second and third carbonyl replacements take place at from about 120° C. to about 180° C., depending upon the reactants used and to some extent upon the pressure in the reaction vessel. The final carbonyl replacement takes place at temperatures from about 140° C. to 270° C. or higher, but the preferred temperature for the final carbonyl replacement is from about 180° C. to about 230° C. At temperatures substantially above 230° C., i.e. 275° C., the reaction time is reduced, but the higher temperatures cause excessive product decomposition; therefore these temperatures are not preferred, but are useful for some applications. At temperatures much below 180° C., i.e. 135° C., the reaction time is greatly increased; therefore the lower ranges are not preferred. The time required for the reaction varies from about 1 hour to about 50 hours depending upon the temperature, pressure, starting material, and substitution compound employed.

The reactions are carried out either with or without a solvent, with the exception mentioned above for the first stage of reaction (1). Any solvent, such as a higher paraffin, which is inert with respect to the reactants and products and is liquid at the reaction temperatures and pressures, is suitable for use in this aspect of the invention. It is preferable, however, to carry out the subsequent substitutions without solvent, since the reactants, for the most part, are liquid at the reaction temperatures.

It is desirable to provide a means for removing the effluent carbon monoxide from the reaction site. This is normally accomplished by venting the reaction chamber to atmospheric pressure through a gas trap means, but other means are useful.

It has also been found desirable to blanket the reactor with an inert gas such as nitrogen, argon or other rare gases, since the presence of more than minute quantities of oxygen tends to accelerate the decomposition of the complex product. In this connection it has been found that applying vacuum to the reaction chamber, during the reaction may be useful under certain conditions.

As mentioned above, the concept of the present invention may be extended to include similar nickel complexes in which arsenic or antimony appears in the place of phosphorus.

The following examples will serve to illustrate the preparation of several organo-phosphorus nickel complexes, but it is understood that these examples are set forth merely for illustrative purposes and many other tetra-substituted nickel complexes are within the scope of the present invention.

EXAMPLE I

A mixture of 3 moles of triphenylphosphite and 1 mole of bis[triphenylphosphite]nickel dicarbonyl were heated to a temperature of 200° C. for about 18 hours under an argon atmosphere. The mixture was then cooled and dissolved in chloroform. This was followed by filtering the mixture and removing the chloroform by vacuum distillation. The remaining solid was washed with methanol and dried. Repeated extractions with acetone removed all of the starting materials and any by-products such as the tris[triphenylphosphite]nickel carbonyl which were formed during the reaction. The insoluble white crystals (93 gms.) were tetrakis[triphenylphosphite]nickel with a melting point of 147–148° C. and a decomposition temperature of 168–170° C. The tetrakis[triphenylphosphite] nickel is a white solid, insoluble in water, methanol and acetone but soluble in benzene, p-dioxane and tetrahydrofuran. It is stable in water and alkaline solutions, but slowly decomposes in the presence of acids or solutions having a pH below 7. The infra red spectrum of this compound is essentially identical to bis(triphenylphosphite) nickel dicarbonyl and tris(triphenylphosphite) nickel carbonyl with the exception of the carbonyl adsorption bands which are absent.

*Analysis.*—Calcd. for $C_{72}H_{60}O_{12}P_4Ni$: C, 66.53; H, 4.65; Ni, 4.52. Found: C, 66.48; H, 4.82; Ni, 4.58.

EXAMPLE II

A mixture of 50 grams (0.068 mole) of bis(triphenylphosphite) nickel dicarbonyl and 150 grams (0.484 mole) of triphenylphosphite was heated in a stirred flask at 180 to 200° C. for about 8 hours under an argon atmosphere. Upon cooling to room temperature the mixture solidified. The solid was dissolved in benzene, filtered, and treated with charcoal. Evaporation of the benzene left a white solid which was washed with methanol. The crystals remaining were filtered and extracted with two 30 ml. portions of cold acetone. The white crystals remaining (11.6 grams) were found to be tetrakis(triphenylphosphite) nickel, while the acetone wash was found to contain 25 grams of unreacted bis(triphenylphosphite) nickel dicarbonyl and some tris(triphenylphosphite) nickel monocarbonyl.

EXAMPLE III

One mole of tris[triphenylphosphite] nickel monocarbonyl was heated to 250° C. for 8 hours with 1.5 moles of triphenylphosphite under an atmosphere of argon. After cooling and dissolving the mixture in benzene, the solution was filtered, treated with charcoal, and the benzene removed under vacuum. The resulting mixture was poured into methyl alcohol and a precipitate was formed. Following acetone extraction of the unreacted and undesired products, tetrakis(triphenylphosphite) nickel (102 gms.) with a melting point of 146 to 148° C. was recovered.

EXAMPLE IV

A mixture of 100 grams (0.136 mole) of tris(triphenylphosphite nickel monocarbonyl and 17 grams (0.065 mole) triphenylphosphine was heated to 170° C. for 4 hours at a reduced pressure of 2 mm. Hg. After cooling, the mixture was slurried with methyl alcohol and filtered. The crystals obtained were dissolved in benzene, treated with charcoal and precipitated with methyl alcohol. There was obtained 10 grams of a white solid, tris(triphenylphosphite) triphenylphosphine nickel, M.P. 124–126° C.

The nickel complexes listed in Table I have been prepared and the physical data for these complexes is presented herein.

As used in this application conversion, selectivity and yield are defined as:

$$\text{Conversion} = \frac{\text{total weight of product}}{\text{weight of feed}} \times 100$$

$$\text{Selectivity} = \frac{\text{weight of single product}}{\text{weight of feed}} \times 100$$

$$\text{Yield} = \frac{\text{weight of single product}}{\text{weight of feed}} \times 100$$

Yield equals the selectivity multiplied by the conversion, and divided by 100.

The following examples serve to illustrate the use of the nickel complexes of this invention as catalysts for the dimerization of butadiene. Although the dimerization reaction is the sole illustration, other organic reactions may be catalyzed within the scope of this invention.

The following procedure was observed in the examples set forth below. The reactions using the nickel complexes as catalysts were carried out in a 500 ml. Magne Dash autoclave. The autoclave was thoroughly cleaned and the catalyst was added to the autoclave. The head of the autoclave was then put into place, and tightened. The autoclave was then evacuated using a vacuum pump and the butadiene was added from a bomb.

EXAMPLE I$^a$ 102 grams of butadiene were charged with 1.8 grams of tetrakis[triphenylphosphite]nickel into the autoclave.

TABLE I

| Complex | Physical State at 20° C. | Color | Melting Point, °C. | Solubility | |
|---|---|---|---|---|---|
| | | | | Acetone | Benzene |
| Tetrakis(tri-p-methoxyphenylphosphite)nickel | Solid | White | 134–138 | Soluble | Soluble. |
| Tetrakis(tri-p-tolylphosphite)nickel | do | do | 116–120 | Insoluble | Do. |
| Bis(triphenylphosphite)bis(triethylphosphite) nickel. | Liquid | Brown | | Soluble | Do. |
| Tetrakis[tri(2-ethylhexyl)phosphite]nickel | Solid | White | 112–115 | Insoluble | Do. |

Although most of the tetra-substituted complexes are insoluble in many solvents, such as water and methanol, the purification step may be advantageously carried out by washing the tetra-substituted nickel complexes in ketones such as acetone. It has been found that most of the tetra-substituted complexes are acetone insoluble, while the remaining materials including the mono-, di-, and tri-substituted nickel carbonyls are acetone soluble.

The nickel complexes of this invention are useful for catalyzing many organic reactions, especially addition-type polymerization reactions. These complexes have been found to be extremely effective for producing cyclic polymers of conjugated acyclic diolefins in which the polymer molecule contains 2, 3, 4 or more monomer groups. The complexes of this invention are especially useful for the catalyst polymerization of 1,3-butadiene and other 1,3-diolefins to form polymeric cyclic compounds which contain four carbon atoms within the ring structure per monomer group and one carbon to carbon double bond per monomer group. Extensive experimentation has shown that these nickel complexes, when used as catalysts for the dimerization of butadiene, will give heretofore unknown and unexpectedly high selectivities in producing cycloocta-1,5-diene and at the same time will maintain the same high conversion percentages which are achieved through the use of some of the known nickel complexes containing carbonyl groups.

It has also been found that by varying the operating conditions, high yields of trimers and other higher molecular weight polymers (e.g., $C_{12}$, $C_{16}$, $C_{20}$ rings, etc.) may be produced with the catalyst of this invention.

The autoclave was heated to 160° C. for about 30 minutes. After cooling and venting the unreacted butadiene, 74.5 grams of material were removed from the autoclave. Analysis of this material gave 74.1% of cycloocta(1,5)diene, 14.3% of vincyclohexene and 11.6% of material with a boiling piont above cyclooctal(1,5)diene. The conversion (percentage of butadiene reacted) was 71.2%.

EXAMPLE II$^a$ 102 grams of butadiene were charged, with 1.5 grams of tetrakis[triphenylphosphite]nickel, into the autoclave. The autoclave was heated to 148° C. for about 45 minutes. After cooling and venting the unreacted butadiene, 89 grams of material (conversion of 86%) were removed from the autoclave. Analysis of this material showed 71.8% cycloocta(1,5)diene, 13.9% vinylcyclohexene, and 14.3% high boiling material.

EXAMPLE III$^a$ 101 grams of butadiene were charged with 1.5 grams of [bis(triphenylphosphite)] [bis(triethylphosphite)] nickel into the autoclave. The autoclave was heated to 148° C. for about 323 minutes. After cooling and venting the unreacted butadiene, 77 grams of material (conversion 76%) were removed from the autoclave. Analysis of this material showed 40.2% cycloocta(1,5)diene, 37.1% vinylcyclohexane, and 22.7% high boiling material.

The results of several more butadiene dimerization runs using tetrakis[triphenylphosphite]nickel are presented below in Table II.

TABLE II

| Catalyst Concentration based on weight of feed | Time, minutes | Temperature, °C. | Conversion | Infra Red Analysis | | |
|---|---|---|---|---|---|---|
| | | | | COD [1] | VCH [2] | HBM [3] |
| 1.0 | 35 | 120 | 88 | 82.8 | 11.6 | 6.6 |
| 0.5 | 35 | 120 | 87 | 78.6 | 11.1 | 10.3 |
| 0.5 | 120 | 100 | 89 | 83.2 | 9.0 | 7.8 |
| 1.0 | 47 | 110 | 90 | 78.8 | 11.3 | 9.9 |

[1] COD=cycloocta-1,5-diene.
[2] VCH=vinylcyclohexene.
[3] HBM=material which has a boiling point above that of COD.

EXAMPLE IVa

Dimethylcyclooctadiene was prepared from isoprene using tetrakis(triphenylphosphite)nickel and a procedure similar to the preceding example.

It has been found that the nickel complexes of this invention may be successfully employed as catalyst in mixtures with nickel complexes containing carbonyl groups. This aspect of the invention lends itself to commercial application in that no purification or only partial purification of the catalyst from the by-product carbonyl containing complexes may be required prior to using the catalyst mixture.

It has been found that the nickel complexes of this invention are useful for continuous reactions as well as the batch-type operations illustrated above. Since the complexes are generally crystalline up to near their decomposition temperature and the dimers of butadiene are liquid at dimerization temperature, the complexes of this invention may be used alone or with other compatable catalysts in fluid bed reactors or like equipment. Variations in the method of employment will be obvious to one skilled in the art.

The reaction temperatures and pressures employed with the catalyst of this invention are determined by the product which is to be produced. Temperatures of from about 90° C. to about 160° C. have been found to yield the highest conversions of butadiene using tetrakis[triphenylphosphite] nickel, but ranges of from about 70° C. to about 200° C. are operable. Optimum temperatures for other nickel complexes fall generally within the 70° C. to 200° C. range. When other monomers are used and/or other products than cycloocta-1,5-diene are to be produced, the temperatures employed may vary somewhat beyond the ranges specified herein.

Although the pressures used in the reaction vessel are not critical, pressures from about 225 p.s.i.g. to about 425 p.s.i.g. are preferred. Pressures substantially less than 225 p.s.i.g. are operable but the reaction time is increased to an undesirable extent. The specified higher pressures are limited to some extent by the equipment in which the reaction is conducted. Pressures exceeding 425 p.s.i.g. and up to 1000 p.s.i.g. or higher are useful for producing cycloocta-1,5-diene, but such pressures are more applicable for producing trimers or other higher polymers.

Catalyst concentrations of about 0.5% to about 1.5% based on the weight of the monomer feed are preferred, but concentrations of from about 0.1 to about 10% on the same basis are useful for producing cycloocta-1,5-diene. Wider ranges of catalyst concentration are useful in other applications. Conversions of from 85% to 90% with 83% or higher cycloocta-1,5-diene selectivities in butadiene dimerizations with the nickel complexes of this invention have been obtained by using the preferred temperatures, pressures, and catalyst concentrations.

The scope of this invention is not to be limited to the use of butadiene. Generally, unsaturated hydrocarbons can be polymerized with the catalysts of this invention. Monomers containing conjugated unsaturation such as isoprene, chloroprene and the like are useful for dimerization, trimerization and like polymerization processes and are preferred. Other suitable conjugated open-chain diolefins, particularly 1,3-diolefins include 1,3-pentadiene (piperylene); phenyldiolefins; 2,3-dichloro-1,3-butadiene; and 2,3-dimethyl-1,3-butadiene. The halogen-substituted conjugated open-chain diolefins preferably have no more than two halogen atoms substituted for hydrogen in each diolefin molecule. Mixed halogen derivatives also may be used.

Auxiliary materials such as dehydrating agents, polymerization inhibitors, and catalyst activators may be used with the catalysts of this invention. The forms of the invention herein shown and described are to be considered only as illustrative. It will be apparent to those skilled in the art that numerous modifications may be made therein without departure from the spirit of the invention or the scope of the appended claims.

I claim:

1. A new composition of matter of the formula

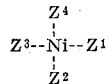

in which $Z^1$, $Z^2$, $Z^3$, and $Z^4$ are of the formula

in which M is selected from the group consisting of phosphorus, arsenic, and antimony; $a$ is a cardinal number of from zero to 1 inclusive; and $R^1$, $R^2$ and $R^3$ are organic radicals selected from the group consisting of alkyl, cycloalkyl, aryl, alkaryl, alkyl substituted cycloalkyl, aralkyl, alkoxyphenyl, alkoxyalkyl, hydroxyphenyl, alkoxy, haloaryl, haloalkyl, and halocycloalkyl radicals.

2. A new composition of matter of the formula

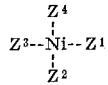

in which $Z^1$, $Z^2$, $Z^3$, and $Z^4$ are of the formula

in which $a$ is a cardinal number of from zero to 1 inclusive; and $R^1$, $R^2$ and $R^3$ are organic radicals selected from the group consisting of alkyl, cycloalkyl, aryl, alkaryl, alkyl substituted cycloalkyl, aralkyl, alkoxyphenyl, alkoxyalkyl, hydrophenyl, alkoxy, haloaryl, haloalkyl, and halocycloalkyl radicals.

3. A new composition of matter as described in claim 2, in which $R^1$, $R^2$, and $R^3$ are aromatic radicals, and $a$ is 1.

4. A new composition of matter as described in claim 2, in which $R^1$, $R^2$, and $R^3$ are halogenated aromatic radicals, and $a$ is 1.

5. A new composition of matter as described in claim 2, in which $R^1$, $R^2$, and $R^3$ are aliphatic radicals, and $a$ is 1.

6. Tetrakis(triphenylphosphite)nickel.

7. Tetrakis(tri-p-methoxyphenylphosphite)nickel.

8. Tetrakis(tri-p-tolylphosphite)nickel.

9. Tetrakis[tri(2-ethylhexyl)phosphite]nickel.

10. Bis(triphenylphosphite)bis(triethylphosphite)nickel.

11. Tris(triphenylphosphite)triphenylphosphine nickel.

12. The composition of claim 2 in which said organic radicals have 18 carbon atoms or less.

13. Tetrakis(trihydrocarbyl phosphite)nickel (O).

14. A method of preparing a nickel complex of the formula $$Z^3{}_d\text{—Ni—}Z^1{}_b$$
$$\underset{Z^2{}_a}{|}\ (Z^4)_{4-(b+c+d)}$$

in which $b$, $c$, and $d$ are cardinal numbers of from zero to one inclusive; and in which $Z^1$, $Z^2$, $Z^3$, and $Z^4$ are of the formula $$P(O_aR^1)(O_aR^2)(O_aR^3)$$

in which $a$ is a cardinal number of from zero to one inclusive; and $R^1$, $R^2$, and $R^3$ are organic radicals selected from the group consisting of alkyl, cycloalkyl, aryl, alkaryl, alkyl substituted cycloalkyl, aralkyl, alkoxyphenyl, alkoxyalkyl, hydroxyphenyl, alkoxy, haloaryl, haloalkyl, and halocycloalkyl radicals; which comprises reacting a nickel complex of the formula $$(Z^1)_b(Z^2)_c(Z^3)_d\text{Ni(CO)}_{[4-(b+c+d)]}$$

wherein $Z^1$, $Z^2$, and $Z^3$ have the aforesaid significance; and $b$, $c$ and $d$ are cardinal numbers of from zero to 1 inclusive; with a compound of the formula $$Z^4$$

wherein $Z^4$ has the aforesaid significance.

15. A method of preparing a nickel complex of the formula $$Z^3\text{—Ni—}Z^1$$
$$\underset{Z^3}{|}\ \overset{Z^4}{|}$$

in which $Z^1$, $Z^2$, $Z^3$ and $Z^4$ are of the formula $$P(O_aR^1)(O_aR^2)(O_aR^3)$$

in which $a$ is a cardinal number of from zero to 1 inclusive; and $R^1$, $R^2$, and $R^3$ are organic radicals selected from the group consisting of alkyl, cycloalkyl, aryl, alkaryl, alkyl substituted cycloalkyl, aralkyl, alkoxyphenyl, alkoxyalkyl, hydroxyphenyl, alkoxy, haloaryl, haloalkyl, and halocycloalkyl radicals; which comprises reacting a compound (A) of the formula $$Z^3\text{—Ni—CO}$$
$$\underset{Z^2}{|}\ \overset{Z^4}{|}$$

in which $Z^2$, $Z^3$, and $Z^4$ have the aforesaid significance, with a compound (B) of the formula $$Z^1$$

in which $Z^1$ has the aforesaid meaning.

16. A method of preparing a nickel complex as described in claim 15 in which a stoichiometric excess of compound (B) is used.

17. A method of preparing a nickel complex as described in claim 15, in which the reaction is carried out at a temperature of from about 140° C. to about 270° C.

18. A method of preparing a nickel complex as described in claim 15, in which the reaction is carried out at a temperature of from about 180° C. to about 230° C.

19. The method of claim 15 in which said organic radicals have 18 carbon atoms or less.

20. A method of preparing a nickel complex of the formula $$Z^3\text{—Ni—}Z^1$$
$$\underset{Z^2}{|}\ \overset{Z^2}{|}$$

in which $Z^1$, $Z^2$ and $Z^3$ are of the formula $$P(O_aR^1)(O_aR^2)(O_aR^3)$$

in which $a$ is a cardinal number of from zero to one inclusive; and $R^1$, $R^2$ and $R^3$ are organic radicals selected from the group consisting of alkyl, cycloalkyl, aryl, alkaryl, alkyl substituted cycloalkyl, aralkyl, alkoxyphenyl, alkoxyalkyl, hydroxyphenyl, alkoxy, haloaryl, haloalkyl, and halocycloalkyl radicals; which comprises reacting a compound (A) of the formula $$Z^3\text{—Ni—}Z^1$$
$$\underset{CO}{|}\ \overset{CO}{|}$$

in which $Z^1$ and $Z^3$ have the aforesaid meanings, with a compound (B) of the formula $$Z^2$$

in which $Z^2$ has the aforesaid meaning.

21. A method of preparing a nickel complex as described in claim 20 in which a stoichiometric excess of compound (B) is used.

22. A method of preparing a nickel complex as described in claim 20 in which the reaction is carried out at a temperature of from about 140° C. to about 270° C.

23. A method of preparing a nickel complex as described in claim 20, in which the reaction is carried out at a temperature of from about 180° C. to about 230° C.

24. A method of preparing a nickel complex of the formula $$Z^2\text{—Ni—}Z^1$$
$$\underset{Z^2}{|}\ \overset{Z^2}{|}$$

in which $Z^1$ and $Z^2$ are of the formula $$P(O_aR^1)(O_aR^2)(O_aR^3)$$

in which $a$ is a cardinal number of from zero to one inclusive; and $R^1$, $R^2$ and $R^3$ are organic radicals selected from the group consisting of alkyl, cycloalkyl, aryl, alkaryl, alkyl substituted cycloalkyl, aralkyl, alkoxyphenyl, alkoxyalkyl, hydroxyphenyl, alkoxy, haloaryl, haloalkyl, and halocycloalkyl radicals; which comprises reacting a compound (A) of the formula $$Z^1\text{---Ni---(CO)}_3$$

in which $Z^1$ has the aforesaid meaning, with a compound (B) of the formula $$Z^2$$

in which $Z^2$ has the aforesaid meaning.

25. A method of preparing a nickel complex as described in claim 24, in which a stoichiometric excess of compound (B) is used.

26. A method of preparing a nickel complex as described in claim 24, in which the reaction is carried out at a temperature of from about 140° C. to about 270° C.

27. A method of preparing a nickel complex as described in claim 24, in which the reaction is carried out at a temperature of from about 180° C. to about 230° C.

28. A method of producing a nickel complex of the formula $$Z\text{—Ni—}Z$$
$$\underset{Z}{|}\ \overset{Z}{|}$$

in which Z is of the formula $$P(O_aR^1)(O_aR^2)(O_aR^3)$$

in which $a$ is a cardinal number of from zero to one inclusive; and $R^1$, $R^2$ and $R^3$ are organic radicals selected from the group consisting of alkyl, cycloalkyl, aryl, alkaryl, alkyl substituted cycloalkyl, aralkyl, alkoxyphenyl, alkoxyalkyl, hydroxyphenyl, alkoxy, haloaryl, haloalkyl, and halocycloalkyl radicals; which comprises reacting (A) nickel tetracarbonyl with a compound (B) of the formula Z in which Z has the aforesaid meaning.

29. A method of preparing a nickel complex as described in claim 28 in which a stoichiometric excess of compound (B) is used.

30. A method of producing a nickel complex as described in claim 28, in which the temperature of the reaction is maintained at less than 40° C. until the evolution of carbon monoxide substantially ceases, followed by raising the reaction temperature to from about 140° C. to about 270° C.

31. A method of producing a nickel complex as described in claim 28, in which the temperature of the reaction is maintained at less than 20° C. until the evolution of carbon monoxide substantially ceases, followed by raising the reaction temperature to from about 180° C. to about 230° C.

References Cited

UNITED STATES PATENTS

| | | | |
|---|---|---|---|
| 2,212,112 | 8/1940 | Clausen | 260—666 |
| 2,373,811 | 4/1945 | Cook et al. | 260—439 |
| 2,461,961 | 2/1949 | Buckman et al. | 260—439 |
| 2,943,117 | 6/1960 | Gleason | 260—666 |

OTHER REFERENCES

Bigorgne: Comptes Rendus, vol. 250, pages 3484–3486, May 23, 1960.

Irvine et al.: Science, vol. 113, 1951, pages 742–743.

Malatesta et al.: Annali di Chimica (Italy), vol. 44, No. 1–6 (1954), pages 134–138.

Malatesta et al.: J. Chem. Soc. (London) (1957), pages 1186–1188.

Malatesta et al.: Ibid. (1938), pages 2323–2328.

TOBIAS E. LEVOW, *Primary Examiner.*

E. C. BARTLETT, A. P. DEMERS, *Assistant Examiners.*